United States Patent

[11] 3,552,566

[72] Inventors Edison Lowe
 El Cerrito;
 Everett L. Durkee, El Sobrante, Calif.
[21] Appl. No. 800,193
[22] Filed Feb. 18, 1969
[45] Patented Jan. 5, 1971
[73] Assignee To the United States of America as represented by the Secretary of Agriculture

[54] REVERSE OSMOSIS SYSTEM FOR CONCENTRATING LIQUID FOODS
 5 Claims, 2 Drawing Figs.
[52] U.S. Cl.................................................... 210/86,
 210/114, 210/134, 210/321
[51] Int. Cl..................................................... B01d 31/00
[50] Field of Search............................................ 210/22, 23,
 86, 112, 114, 134, 141, 321

[56] References Cited
UNITED STATES PATENTS
1,825,631 9/1931 Horvath........................ 210/23
OTHER REFERENCES
Morgan, Jr. et al., " Reverse Osmosis," from FOOD TECHNOLOGY, Vol. 19, No. 12, pages 52— 54 relied on, 1965.

Primary Examiner—Frank A. Spear, Jr.
Attorneys—R. Hoffman, W. Bier and W. Takacs ABSTRACT: Process and apparatus by which concentrated products produced at high pressures within a reverse osmosis concentrator may be withdrawn at a predetermined degree of concentration and without damage to their intrinsic properties even though they exhibit non-Newtonian properties. The invention is of particular importance in preparing concentrated products from liquid foods such as juices, lacteal fluids, egg white, etc.

PATENTED JAN 5 1971 3,552,566

E. LOWE & E.L. DURKEE
INVENTORS

BY R. Hoffman
W. Takacs
ATTORNEYS

REVERSE OSMOSIS SYSTEM FOR CONCENTRATING LIQUID FOODS

A nonexclusive, irrevocable, royalty-free license in the invention herein described, throughout the world for all purposes of the United States Government, with the power to grant sublicenses for such purposes, is hereby granted to the Government of the United States of America.

DESCRIPTION OF THE INVENTION

The invention relates in general to the art of concentrating liquids by reverse osmosis. More particularly, the invention is concerned with and has among its objects the provision of novel apparatus and process for controlling the degree of concentration attained in reverse osmosis operations, and for discharging concentrated product from such operations without damage to the product. Further object of the invention will be evident from the following description.

Unless otherwise specified, degrees of concentration referred to herein are by volume. For example, if 100 volumes of starting liquid is reduced to 50 volumes by elimination of 50 volumes of water, the product may be termed a two-fold concentrate; if the same original volume of liquid is reduced to 33⅓ volumes, one will have a three-fold concentrate; and so on. The rate of flow of liquids is also herein referred to on a volume basis.

In recent years it has been shown that reverse osmosis is useful for concentrating various liquid foods such as fruit juices, vegetable juices, milk, egg white, and the like. See, for example, Lowe and Durkee, U.S. Pat. No. 3,341,024, and Popper, U.S. Pat. No. 3,423,310. In conducting reverse osmosis the liquid to be concentrated is applied under superatmospheric pressure against a suitable membrane. Water (from the liquid) passes through the membrane, leaving a residue of concentrated liquid on the upstream side of the membrane. The permeate (water) and concentrate are separately discharged from the system.

In conducting reverse osmosis operations, various problems are encountered. One involves the matter of controlling the degree of concentration achieved. For example, the operator may require a product of two-fold concentration or one four-fold concentration, etc., depending on particular circumstances. It might be thought that such control could be attained by providing a valve in the concentrate discharge line to throttle the rate of discharge—for example, if a two-fold product is desired, to crack the valve to such a degree that the rate of discharge of concentrate is one-half the rate of inflow of starting liquid. Such a technique, however, is completely inoperative, primarily because of the intrinsic properties of the liquids being handled. Virtually all liquid food products such as fruit and vegetable juices; milk, whey, and other lacteal fluids; egg white and other egg liquids; etc. are non-Newtonian That is, the viscosity of these liquids is a function of the shear rate that is imposed on the liquid. The higher the shear rate, the lower the viscosity of the liquid, and vice versa. This, of course, is in sharp contrast to Newtonian liquids (water or aqueous salt solutions, e.g.) in which case viscosity does not change with rate of shear. Consequently, in handling liquid food products, if throttling is applied to the concentrate discharge line, the system will operate erratically. For example, if the valve is just barely cracked the rate of shear will be low, viscosity will be high, and the flow will decrease or cease completely. If then the valve is opened further, the shear rate will increase with resulting decrease in viscosity and the liquid will pour out at an excessive rate. Readjustment of the valve will simply start the cycle again with the flow in any valve position being completely unpredictable and unstable.

A primary object of the invention is the provision of means for obviating the problem outlined above. By applying the principles of the invention one is enabled to readily control the degree of concentration attained in reverse osmosis procedures, even where the liquid being treated is non-Newtonian.

Another problem in reverse osmosis concentrations is the matter of damage to the product. If the products are released directly from the high-pressure environment of the reverse osmosis equipment, or especially if they are released through a throttling device, they are subjected to extreme shear stresses which cause irreversible changes in their properties. A typical case in this regard is egg white. Egg white is especially valuable in the baking industries Another problem in reverse osmosis concentrations is the matter of damage to the product. If the products are released directly from the high-pressure environment of the reverse osmosis equipment, or especially if they are released through a throttling device, they are subjected to extreme shear stresses which cause irreversible changes in their properties. A typical case in this regard is egg white. Egg white is especially valuable in the baking industries for its aeration properties. If, however, egg white is subjected to high shear stresses as in passing directly, or with throttling action, from a high-pressure zone to one at atmospheric pressure, its aeration properties are substantially impaired. One of the prime objects of the invention is the provision of means for alleviating this problem. Thus, by application of the principles described herein one is able to withdraw concentrated products from the reverse osmosis system while retaining the original properties thereof, including the aeration properties of egg products.

The manner in which the aforesaid objects and advantages are attained is next described in detail, having reference to the annexed drawing, wherein.

Figure 1:
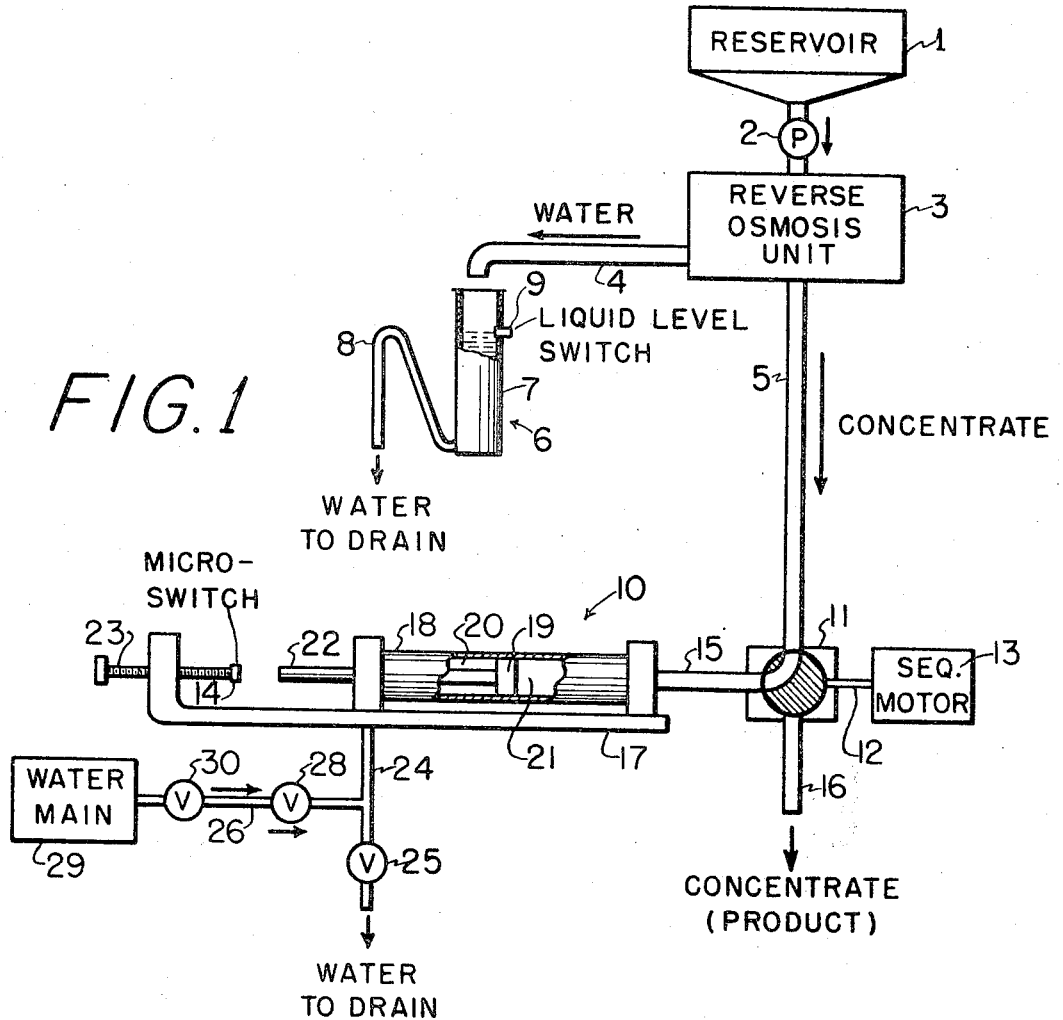
FIG. 1 is a diagrammatic view of apparatus in accordance with the invention. To avoid confusion with the mechanical parts, electrical connections have been omitted.

Referring now to FIG. 1, the liquid to be concentrated—egg white, for example—is held in reservoir 1.

The manner i which the aforesaid objects and advantages are attained is next described in detail, having reference to the annexed drawing, wherein:

FIG. 1 is a diagrammatic view of apparatus in accordance with the invention. To avoid confusion with the mechanical parts, electrical connections have been omitted.

Figure 2:
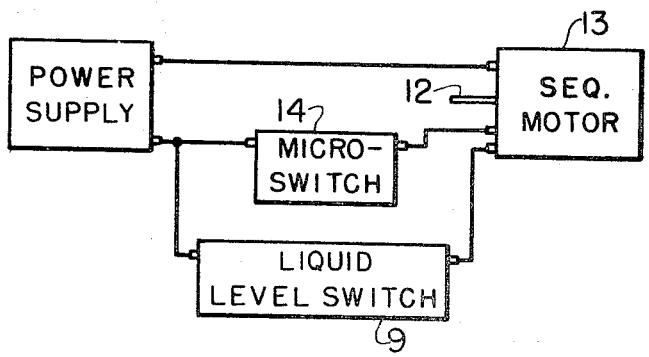
FIG. 2 is a wiring diagram illustrating the connections of the various electrical components of the apparatus of FIG. 1.

FIG. 2 is a wiring diagram illustrating the connections of the various electrical components of the apparatus of FIG. 1.

Referring now to FIG. 1, the liquid to be concentrated—egg white, for example—is held in reservoir 1.

The egg white is forced under superatmospheric pressure by pump 2 into the reverse osmosis concentrator represented by block 3. This latter device may embody any of the known devices such as that of Lowe and Durkee, U.S. Pat. No. 3,341,024. The particular structure of the reverse osmosis unit forms no part of the present invention.

Reverse osmosis unit 3 is provided with pipe 4 for discharge of water (permeate), and pipe 5 for discharge of the concentrated product. It will, of course, be understood by those skilled in the art that the concentrated product leaving unit 3 is under superatmospheric pressure, typically on the order of about 100 to about 2000 p.s.i.g.

The illustrated apparatus includes an automatic syphon, generally designated as 6. This syphon meters the outflow of water (permeate) from reverse osmosis unit 3, and also cooperates with a discharge metering unit (hereinafter described) to correlate the discharge of concentrate with the discharge of water (permeate), thereby providing means for controlling the degree of concentration attained in the reverse osmosis concentration. Details on the construction and operation of syphon 6 are provided below.

Syphon 6 includes an open-topped container 7 and a discharge pipe 8. The water leaving unit 3 via pipe 4 flows into container 7. When the water collecting in container 7 rises to the level indicated, syphon action takes over and the container is quickly emptied via pipe 8. During operation of the system, container 7 is repeatedly filled and emptied by this syphon action.

A liquid-level switch 9 (which may take the form of a zero current relay, for example) is provided near the top of container 7. Each time the water level rises to the point that syphon action takes over, switch 9 is actuated and it in turn actuates sequential motor 13 as hereinafter explained.

Reference numeral 11 designates a rotary ball valve operated through shaft 12 by motor 13. This motor is of the sequential type, that is, when it is energized (by liquid-level switch 9 or by microswitch 14) it will rotate 180° and come to a dead stop. Thus, when motor 13 is energized by liquid-level switch 9 it rotates valve 11 to the position shown in FIG. 1, that is, with communication between pipe 5 and pipe 15. When energized by microswitch 14, motor 13 rotates valve 11 180° so that there is communication between pipe 15 and pipe 16. For controlling the discharge of concentrate in cooperation with syphon 6, there is provided a concentrate metering unit generally designated as 10. This unit includes base plate 17 on which is mounted cylinder 18. A free piston 19 subdivides cylinder 18 into compartments 20 and 21. Attached to piston 19 is a piston rod 22 which passes (via a conventional gland or seal, not illustrated) to the exterior of cylinder 18. Microswitch 14 is mounted on threaded rod 23 so that the position of switch 14 can be adjusted for particular conditions. In operation, microswitch 14 cooperates with piston rod 22 as hereinafter explained.

For controlling the discharge of concentrate in cooperation with syphon 6, there is provided a concentrate metering unit generally designated as 10. This unit includes base plate 17 on which is mounted cylinder 18. A free piston 19 subdivides cylinder 18 into compartments 20 and 21. Attached to piston 19 is a piston rod 22 which passes (via a conventional gland or seal, not illustrated) to the exterior of cylinder 18. Microswitch 14 is mounted on threaded rod 23 so that the position of switch 14 can be adjusted for particular conditions. In operation, microswitch 14 cooperates with piston rod 22 as hereinafter explained.

At its right end cylinder 18 communicates with pipe 15, at its left end with pipe 24 equipped with needle valve (adjustable orifice) 25. A branch pipe 26 equipped with check valve 28 is connected to main 29 which provides a supply of water under usual house pressure, e.g., about 35—75 p.s.i.g. During operation, compartment 20 is kept full of water at the pressure supplied by main 29. Needle valve 25 permits the discharge of excess water from compartment 20 as piston 19 traverses to the left, while maintaining the desired back pressure of water in compartment 20. Check valve 28 prevents water from backing up into the house line. A valve 30 is also included in the system so that one may control the rate at which water from main 29 will enter pipe 26 and other units connected therewith. During the operation, valve 30 remains in a set position.

The operation of the controlled discharge system is explained as follows:

The operation of the controlled discharge system is explained as follows: As the action in reverse osmosis unit 3 takes place, water (permeate) is discharged into cylinder 7. When the water level rises to contact switch 9, motor 13 is triggered to rotate valve 11 to the position shown in FIG. 1. This allows concentrate to flow into compartment 21 where it meets the resistance offered by the water present in compartment 20. The concentrate being at higher pressure, forces piston 19 to the left and this, in turn, forces excess water out of the system via needle valve 25, this valve having been preset to provide a small orifice. By providing a back pressure of water in this manner the concentrate is gradually removed from the reverse osmosis unit 3 without subjecting it to excessive stress. At the same time a metering effect is attained. Thus, when piston rod 22 moves far enough to the left to contact microswitch 14, valve 11 is rotated to a second position whereby flow of concentrate into compartment 21 ceases. Instead, compartment 21 is now in communication with product discharge pipe 16. Since the end of this pipe is open to the atmosphere, the concentrate in compartment 21 is instantly depressurized. The concentrated product is, however, to the position shown in FIG. 1. This allows concentrate to flow into compartment 21 where it meets the resistance offered by the water present in compartment 20. The concentrate being at higher pressure, forces piston 19 to the left and this, in turn, forces excess water out of the system via needle valve 25, this valve having been preset to provide a small orifice. By providing a back pressure of water in this manner the concentrate is gradually removed from the reverse osmosis unit 3 without subjecting it to excessive stress. At the same time a metering effect is attained. Thus, when piston rod 22 moves far enough to the left to contact microswitch 14, valve 11 is rotated to a second position whereby flow of concentrate into compartment 21 ceases. Instead, compartment 21 is now in communication with product discharge pipe 16. Since the end of this pipe is open to the atmosphere, the concentrate in compartment 21 is instantly depressurized. The concentrated product is, however, not damaged because there is no flow i.e., the product is not subjected to shear forces. It is thus a significant advantage of the invention that the concentrated product is depressurized while in a static condition, whereby the pressure reduction is achieved without damage to its properties. After the above-described depressurization takes place, the pressure on the left side of piston 19 is the higher and consequently the influx of water through pipe 24 forces the concentrate from compartment 21 via valve 11 and pipe 16 out of the system. The rate at which the concentrate is discharged depends on the setting of valve 30. In typical operations, this valve is set so that the concentrate is discharged gradually, rather than in a sudden burst, whereby to avoid subjecting it to undue stresses.

Meanwhile, of course, additional water (permeate) has been flowing into container 7 and when the level of water reaches switch 9 the discharge cycle commences again.

The following explanation illustrates how the system may be adjusted to secure a desired degree of concentration.

If, for example, it is desired to obtain a two-fold concentrate one proceeds as follows: The position of microswitch 14 is so set that piston rod 22 contacts this switch when compartment 21 takes on the same volume as the effective volume of container 7. (By effective volume is meant the volume of container 7 considered from its base up to the level at which syphon action takes over.) In this way one obtains one volume of concentrate per volume of water removed from the starting liquid. If, on the other hand, a more highly concentrated product is desired, one would adjust the position of microswitch 14 so that it is contacted by piston rod 20 when the volume of compartment 21 is a predetermined fraction of the effective volume of container 7. For example, if the setting of rod 23 is such that the switch 14 is triggered when compartment 21 has a volume one-half of the effective volume of container 7, one will achieve a 2:1 concentration, or, expressed in other terms, a three-fold concentrate.

As explained above, in the system of the invention the discharge of concentrate is controlled by metering the discharge of permeate. This system not only provides the desired result that the ratio of concentration can be set and maintained at any desired level, but also provides additional advantages of simplicity and economy. These latter advantages stem from the fact that the permeate is discharged from the reverse osmosis concentrator at essentially atmospheric pressure. Hence the metering of this liquid, the permeate, can be done with simple and inexpensive equipment, such as the syphon arrangement shown in FIG. 1.

The invention is of wide applicability and can be used for the concentration of liquid foods of all kinds. Typical liquids to which the invention may be applied are listed below solely by way of example and not limitation:

Fruit and Vegetable Products: Juices, extracts, pulps, purees, and similar liquid products derived from fruits or vegetables such as orange, grapefruit, lemon, lime, apple, pear, apricot, strawberry, raspberry, cranberry, pineapple, grape, prune, plum, peach, cherry, tomato, celery, carrot, spinach, onion, lettuce, cabbage, potato, sweetpotato, watercress, etc. The liquid products may be prepared in customary manner by subjecting edible portions of the produce to such operations as reaming, pressing, macerating, crushing, comminuting, extracting with water, cooking, steaming, etc. These operations may be applied to the fresh produce or to processed produce, that is, produce which has been subjected to such operations as cooking, blanching, freezing, canning, sundrying, sulphiting, or preservation by application of chemical preservatives or ionizing radiations.

Meat and Fish Products: Meat extracts, meat juices, soups or broths made from meat or fish products with or without added vegetative material, clam juice, oyster stew, fish or clam chowders, etc.

Lacteal Products: Whole milk, skim milk, whey, cream, buttermilk, yogurt, milk products containing such additives as chocolate, cocoa, sugar, malt, vitamins, sugar, etc.

Cereal Products: Aqueous extracts of cereals such as wheat, barley, malted barley, rice, corn, etc.

Beverages: Aqueous extracts of coffee, tea, chocolate, yerba mate, roasted cereal products (simulated coffee products), etc.

Carbohydrate Substances: Honey, maple syrup, corn syrup, sorghum syrup, molasses, etc.

Egg Products: Egg white, egg yolk, whole egg, or preparations of egg with other foods such as milk, cream, sugar, flavorings, etc.

Miscellaneous: Juices, extracts, purees and other liquid products made from alfalfa, clover, grasses, cottonseed or soybean meals, sugar cane, sugar beet, sorghum, animal blood, etc. Vitamin preparations such as solutions of ascorbic acid, thiamin or other vitamins, vitamin concentrates or precursors, fermentation products such as beers (culture liquors) containing mushroom mycelium, yeasts, biosynthesized vitamins, etc.

We claim:

1. Apparatus for concentrating a liquid food by reverse osmosis which comprises:
   a. a reverse osmosis concentrator;
   b. means communicating with said concentrator for feeding it with the liquid food under superatmospheric pressure;
   c. a first outlet communicating with said concentrator for discharge of permeate water;
   d. metering means for metering the discharge of water through said first outlet;
   e. a second outlet communicating with said concentrator for removal of concentrate under superatmospheric pressure, and
   f. flow control means interposed in said second outlet and cooperative with said metering means for removing concentrate at a rate proportionate to the discharge of permeate water.

2. The apparatus of claim 1 wherein the flow control means of section $f$ includes means for depressurizing the concentrate while in a condition of zero flow, whereby to avoid damage to its properties.

3. The apparatus of claim 1 wherein means is provided for depressurizing the concentrate while in a static condition.

4. Apparatus for concentrating a liquid food by reverse osmosis which comprises:
   a. a reverse osmosis concentrator;
   b. means communicating with said concentrator for feeding it with the liquid food under superatmospheric pressure;
   c. a first outlet communicating with said concentrator for discharge of permeate water;
   d. metering for metering the discharge of water through said first outlet;
   e. a second outlet communicating with said concentrator for removal of concentrate under superatmospheric pressure;
   f. a cylinder containing a movable piston;
   g. a conduit connecting said second outlet with the cylinder, and having a valve interposed therein;
   h. means cooperative with said metering means for periodically opening said valve in response to discharge of a predetermined amount of permeate water, whereby to permit entry of concentrate into said cylinder, the pressure of the entering concentrate causing movement of said piston;
   i. means cooperative with the movement of said piston for closing said valve when the cylinder has received a predetermined amount of concentrate; and
   j. means for ejecting the depressurized concentrate from said cylinder.

5. The apparatus of claim 4 wherein means is provided for depressurizing the concentrate while it is in a static condition in said cylinder.